Figure 3:
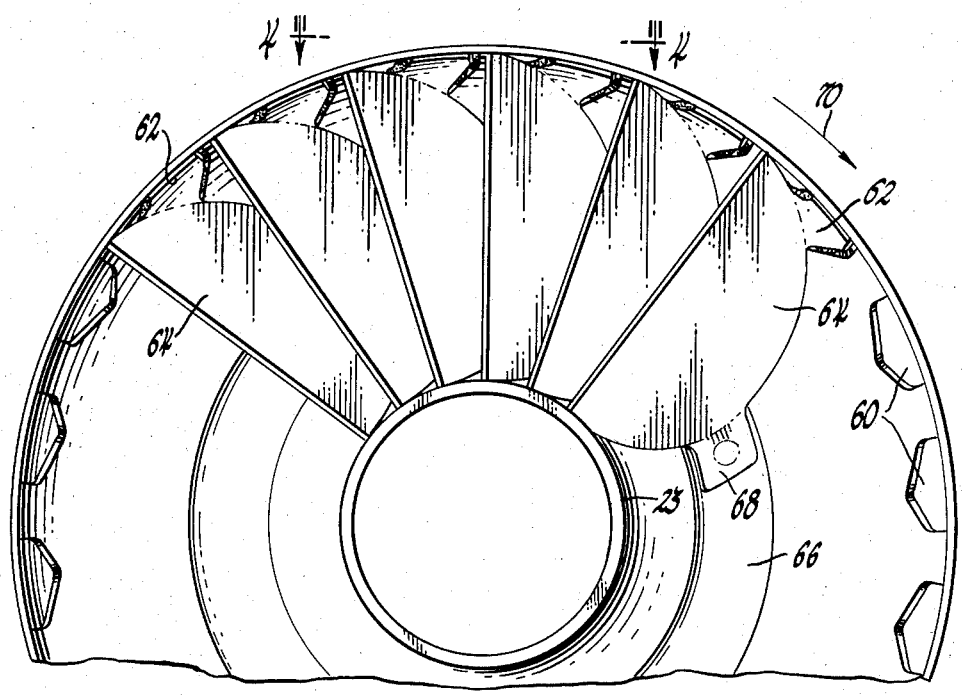

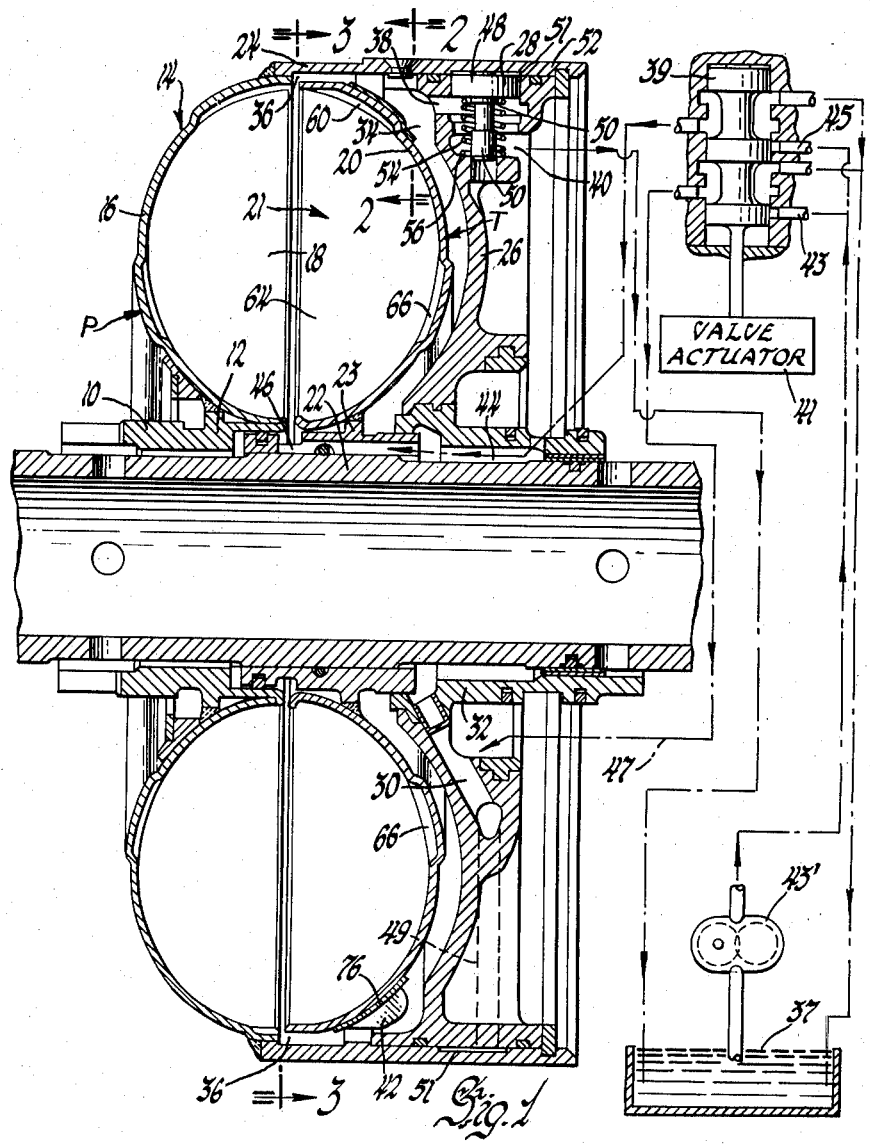

Aug. 11, 1959     D. R. SAND ET AL     2,898,738
HYDRODYNAMIC DRIVE DEVICE
Filed Sept. 12, 1955     3 Sheets-Sheet 2

INVENTORS
Darrel R. Sand &
BY Thomas R. Zimmer, Jr.
W. C. Middleton
ATTORNEY

Aug. 11, 1959    D. R. SAND ET AL    2,898,738
HYDRODYNAMIC DRIVE DEVICE
Filed Sept. 12, 1955    3 Sheets-Sheet 3

INVENTORS
Darrel R. Sand &
BY Thomas R. Zimmer, Jr.
W. C. Middleton
ATTORNEY

United States Patent Office 2,898,738
Patented Aug. 11, 1959

2,898,738

HYDRODYNAMIC DRIVE DEVICE

Darrel R. Sand, Plymouth, and Thomas R. Zimmer, Jr., Livonia, Mich., assignors to General Motors Corporation, Detroit, Mich., a corporation of Delaware Application September 12, 1955, Serial No. 533,743

6 Claims. (Cl. 60—54)

This invention relates to a hydrodynamic drive device adapted to be filled and emptied of fluid and having blade means attached to one part of the device for directing or guiding the fluid toward exhaust valves as the device empties.

In automatic transmissions having friction clutches and/or brakes, it is often desirous, while the vehicle is under way, to disengage a clutch and engage a brake, or vice versa. Due to the varying torque load, engagement of a clutch can be quite sudden, with a resultant "lurching" effect or motion of the vehicle being apparent to the driver. To eliminate this, a fluid coupling or hydrodynamic drive device may be used in place of the friction clutch, since such a device can slip without damaging the device and yet give ease of engagement. Since a fluid coupling is replacing the friction clutch, it must be capable of being filled and emptied so that it will either transmit torque or not. Valving is usually provided to control the exhaust of fluid from the coupling to assure that there will be no escape of fluid when it is desired to transmit torque, and yet permit the coupling to empty quickly when it is not desired to transmit torque. Due to the centrifugal pressure developed by the revolving liquid as the coupling rotates, the exhaust valves are generally located at the periphery of the coupling. Often, however, the centrifugal head of the liquid is sufficient enough to tend to keep the liquid at the peripheral portion of the coupling instead of exhausting out through the exhaust valves, and a resultant "piling up" of the liquid occurs at the coupling outer periphery. This invention obviates this difficulty by providing a plurality of fluid directing blades on the outer shell of the turbine member to break up the fluid mass at the coupling outer periphery and to direct the fluid into the exhaust valves as the turbine slows down.

Therefore, it is an object of this invention to provide means attached to the coupling adapted to empty the same in a fast and efficient manner.

It is another object of this invention to provide a fluid coupling or hydrodynamic drive device with means assuring a rapid disestablishment of driving torque through the coupling.

It is a further object of this invention to provide fluid directing vanes on the turbine element of a fluid coupling to route the coupling exhaust fluid in as nearly a direct path as possible to a plurality of fluid exhaust valves.

It is still a further object of this invention to provide means attached to a rotating part of a fluid coupling to prevent "building up" or "piling up" of the fluid at the outer periphery of the coupling as the fluid is discharged towards the fluid exhaust valves.

Another object of this invention is to construct a fluid coupling in such a manner that its component parts can be easily and compactly assembled with a minimum number of operations.

Figure 4:
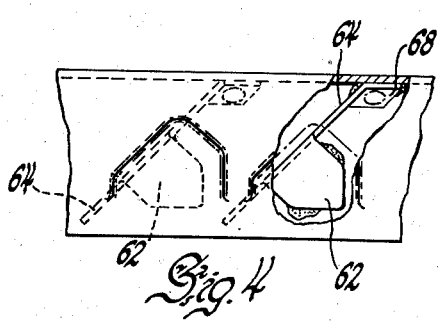
Figure 5:
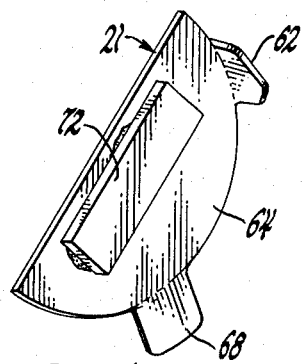
Figure 6:
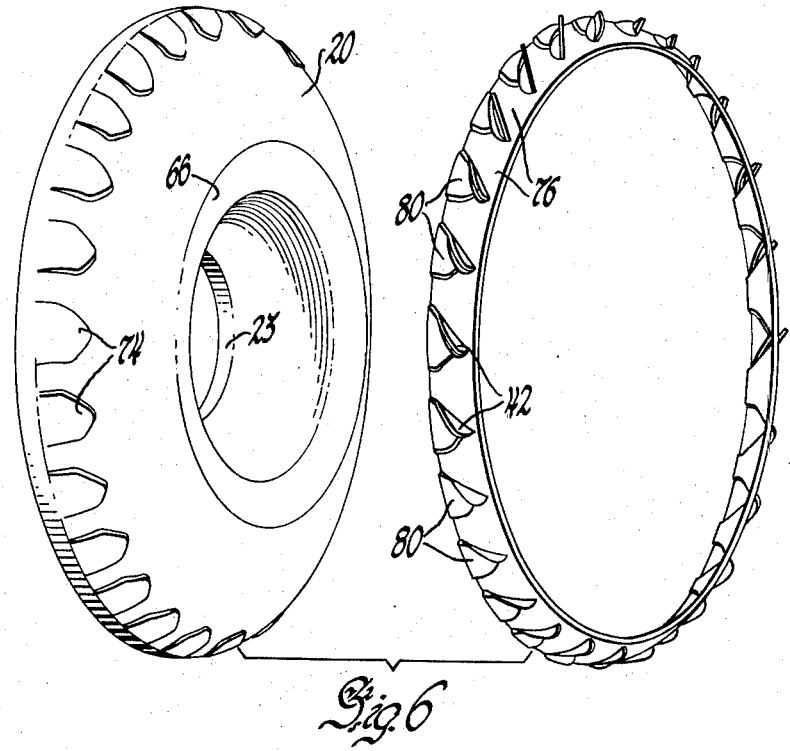
Figure 7:
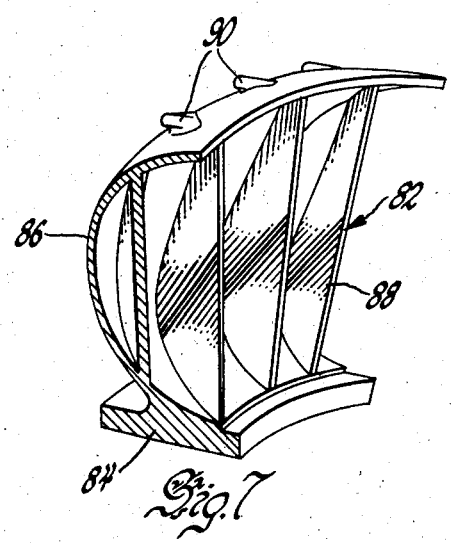

Other features, advantages and objects will become apparent by reference to the detailed description of the invention and to the drawings wherein:

Figure 1 is a cross-sectional view of a fluid coupling showing an embodiment of the present invention, Figure 2 is a partial plan view of the fluid exhaust directing blades as viewed in the direction of the arrows 2—2 of Figure 1, Figure 3 is a detail partial cross-sectional view of the turbine member of the fluid coupling as viewed in the direction of the arrows 3—3 of Figure 1, Figure 4 is a partial plan view of the outer turbine shroud member as viewed in the direction of the arrows 4—4 of Figure 3, Figure 5 is a separate view of a turbine blade member showing its attaching tabs, Figure 6 is an exploded view of the turbine outer shroud member and the fluid exhaust directing blade ring showing the method of attachment of the two, and Figure 7 is a segmental piece of the turbine member of the fluid coupling showing a modification of the embodiment shown in Figure 1.

Referring to the drawings and more particularly to Figure 1, 10 indicates a driving member which may be driven by any suitable means having connected at one end thereof the hub 12 of the pump P of a fluid coupling 14. Connected to the hub for rotation therewith is a casing or shroud member 16 having secured thereto a plurality of impeller or pump blades 18 having semi-elliptical shapes in cross section and facing a turbine shroud 20 of turbine T having secured thereto similarly shaped turbine blades 21. The hub of turbine T is secured to the driven shaft 22.

The casing or shroud 16 has an extension 24 terminating in an enlarged wheel-like rotatable portion 26. This enlarged rotatable portion 26 contains a plurality of valves 28 mounted adjacent the periphery of extension 24, and bores 30 drilled within bosses 32 projecting from the hub, for controlling the exhaust of fluid from the fluid coupling. The space between the driven rotor or turbine T and portion 26 of the shroud provides a chamber 34 adapted to be filled with liquid from the coupling. Valves 28 control the exhaust of fluid from this chamber to an oil reservoir 37 through passages 38 and 40, passage 40 opening into a common drain passage connected to the reservoir.

Valve 28 is shown in Figure 1 in a position permitting the discharge of fluid from chamber 34 to passage 40, and consists of a spooled-type valve mounted for reciprocation within a hollowed-out portion of the shroud extension portion 26. The valve at one end has an enlarged portion 48 adapted to be acted upon by fluid pressure supplied to the end of the valve through a conduit 49 in portion 26 and a passage 51 in the shroud 16 connecting bore 30 and end 48, and a plurality of smaller lands 50 permitting the communication between chamber 34 and passage 40. The peripheral portion of shroud extension 24 also acts as a cover plate at 52 to provide a fluid pressure seal and a stop for the upper movement of valve 28. A spring 54, seated between the shoulder 56 of the rotatable shroud and the enlarged land 48, normally maintains the valve in the position shown.

Attached to the outermost radial portion of the turbine shroud member 20 are a plurality of fluid exhaust guiding or directing blades 42 positioned in the path of fluid flow to exhaust valve 28 such that fluid present at opening 36 of the coupling will be moved directly to the exhaust valves without "piling up" of the fluid at the periphery of the coupling as in couplings without these blades. The purpose of these blades will be described more in detail hereinafter in connection with the operation of the coupling.

In the actual operation of the device, upon rotation of driving shaft 10 with the coupling empty of fluid, pump blades 18 will spin freely without transmitting torque to turbine blades 21. Valve 28, which rotates with pump shroud 16, will be in the position shown due to the action of spring 54 and centrifugal force acting on the valve, permitting the exhaust of any fluid present in the coupling to the reservoir 37 by means of passages 38 and 40.

When it is desired to transmit torque through the coupling to driven shaft 22 while pump P is rotating, a spool-type valve 39 is actuated by a valve actuator 41 to connect supply lines 43 and 45 to lines 44 and 47 to permit fluid under pressure from a fluid gear pump 43' of the conventional positive displacement type to fill coupling 14 and chamber 34 through the conduit 44 and opening 46 in the hub of driven shaft 22, and simultaneously supply fluid through line 47 to bores 30 and 49 and passage 51 to actuate valve 28 to its closed position preventing discharge of the fluid in the coupling. As the stages of filling the coupling progressively change from empty to full, pump 18 will cause the fluid to be circulated to move the turbine member from a state of rest to substantially 1 to 1 speed ratio with respect to the pump depending upon the amount of slip present in the coupling.

When it is desired to stop torque transmission through the coupling, the fluid supplies for filling the coupling and actuating valve 28 respectively are shut off or discontinued by movement of the valve 39 by the valve actuator to the position shown draining the fluid in lines 44 and 47 to the reservoir 37, thus permitting valve 28 to be actuated by spring 54 aided by centrifugal force acting on the valve to an open position permitting the discharge of fluid from chamber 34 and the coupling opening 36. As the coupling empties of fluid, turbine member T will slow down in relation to the speed of pump P due to slip characteristics brought about by the reduction in the volume of liquid until a point is reached where the reaction due to the load on driven shaft 22 is sufficient to stop rotation of the turbine. However, due to the centrifugal force acting on the mass of liquid contained in the coupling and in chamber 34, a layer of liquid tends to remain at the outer periphery of the coupling instead of discharging through exhaust valve 28, and tends to block the complete discharge of fluid with the resultant effect that even though turbine T is stopped, pump W will still be attempting to rotate the turbine through this small amount of fluid still remaining in the coupling, with a consequential loss in horsepower with respect to the driving shaft 10, which is undesirable. This situation is remedied by blades 42 which are shaped and positioned so as to break up this layer of fluid while the turbine is slowing down in relation to the speed of the pump and direct the fluid towards the exhaust valves 28 to assure a quick emptying action. As the coupling is finally emptied, turbine T will come to rest bringing driven member 22 to rest.

The manner in which the fluid exhaust directing blades 42 are mounted on the turbine shroud and the details of construction of the coupling will now be described. Since both the pump member and the turbine member have similarly constructed shroud and blade members, it is deemed necessary to describe only one at the present time; namely, the turbine member. The turbine member is selected because of the mounting of the fluid exhaust directing blades on its shroud member.

As shown in Figures 1, 3, 4 and 6, the turbine member consists of an outer dish-shaped shroud or shell 20 stamped from sheet metal or the like to which can be attached a hub 23. Along the periphery of the shell or shroud at its inside diameter, a plurality of concave depressions 60 are formed to accommodate a plurality of tabs 62 formed integral with the sheet metal turbine blades or vanes 64 as seen in Figure 5. Similarly, adjacent the hub 23 of the turbine shroud is formed a concave channel 66 to accommodate a plurality of tabs 68 also formed integral with the blades or vane members 64. Tabs 62 and 68 have shapes corresponding to the shape of the depressions 60 and channel 66, respectively. The tabs on vanes 64 are so positioned on the vane that, when assembled to the shroud, the blade as a whole will be in a position at an oblique angle to the plane of the axis of rotation of the coupling, thereby increasing the torque transmission from the pump member. As seen in Figure 3, the turbine blades are mounted bent in a backward direction in relation to the direction of rotation of the turbine, which is indicated by the arrow 70. The blades are assembled with the tabs mounted flush against the depressions 60 and channel 66, and then secured to the shell of the turbine 20 by any suitable means, such as by welding. Balance weights 72 may be added to the blade or vane members selectively to control the amount of vibration set up by rotation of the coupling.

Figures 2 and 6 indicate the manner in which the fluid exhaust directing blades are mounted on the turbine shroud member. In these figures, the convex portions 74 of the concave depressions 60 are shown on the outside peripheral portion of the turbine 20. Also shown in Figure 6 is a ring-like sheet metal member or shell 76 having a plurality of blade members 42. Said blade members 42 are formed by perforating the ring 76 to correspond to the curved portion of the blade and at the angle desired, and then bending the blade form up along its straight edge to create an upstanding blade. Concave-convex portions 80 are stamped in the ring 76 to cooperate with the convex raised portions 74 on the shell or shroud of the turbine 20. The blades 42 are attached or connected to the turbine shroud 20 by telescoping the portions 80 of the ring 76 over the portions 74 of shroud 20 as shown in Figure 2, and suitably fixing the two together, as by welding or the like. The blades are positioned at an angle so as to direct the fluid exhausting from the coupling at 36 towards the exhaust valves 28 in the most direct path.

Figure 7 shows a modification of the assembly method of the previous figures and illustrates a cast turbine unit 82 having a hub 84 integrally connected to an outer semi-elliptical shroud member 86 provided with a plurality of blade members 88. Blades 88 differ from blades 64 only in the manner in which they are cast. Blades 88 are twisted slightly as shown in Figure 7 to make possible the casting of the turbine unit in a single operation instead of a piecemeal operation with plaster casts. Cast on said shroud 86 are a plurality of fluid exhaust directing blades 90 for the purpose already described in connection with Figures 1–6. The embodiment shown in Figure 7 has the advantage of eliminating the necessity of welding or brazing operations by being cast as a whole.

From the foregoing, it will be seen that applicants have developed a hydrodynamic drive device that is capable of being emptied and filled in a smooth and efficient manner, and one that is capable of being assembled with a minimum number of operations. It will be understood that the invention can be modified beyond the illustrated embodiments, and therefore any limitations to be imposed are those set forth in the following claims:

We claim:
1. A hydrodynamic drive device capable of being filled and emptied of fluid comprising drive and driven members, a bladed pump element connected to said drive member, a turbine element connected to said driven member, said turbine element having blades thereon cooperating with the blades of said pump element for circulat- ing fluid therebetween, said elements having a fluid discharge opening therebetween, valve means rotatable with the said pump element and controlling the discharge of fluid from said coupling, and external blade means carried by said turbine element adjacent said opening for directing fluid discharged from said coupling towards said valve means, said blade means comprising a ring having a plurality of blades thereon, said turbine element telescopically receiving said ring, and means securing said ring to said turbine element.

2. A hydrodynamic drive device capable of being filled and emptied of fluid comprising, a plurality of rotatable driving and driven members cooperating together to define a fluid flow circuit therebetween, conduit means for supplying fluid to said device for filling the same, a fluid discharge opening in said device, means for receiving fluid discharged from said fluid flow circuit through said opening, valve means controlling the discharge of fluid from said device, and a plurality of fluid discharge directing blades mounted on said driven member for rotation therewith and positioned in the path of fluid flow discharged through said opening to direct fluid discharged from said fluid circuit into said valve means, said latter blades being removably mounted on said driven member, said removable mounting comprising a ring having said fluid directing blades mounted thereon, said ring being telescopically received by said driven member.

3. In a hydraulic coupling having rotatable pump and turbine members together cooperating to define a fluid flow path therebetween, means for supplying fluid to said coupling for filling the same, valve means controlling the discharge of fluid from said coupling, and a plurality of blade means connected for rotation with said turbine member, said coupling having a fluid discharge opening between said pump and turbine members at their outermost radial points, said blade means being positioned in the path of fluid flow between said discharge opening and said discharge valve means directing the fluid flow into said valve means, said blade means comprising a ring having a plurality of blades thereon, said turbine member telescopically receiving said ring thereon, and means securing said ring to said turbine member.

4. A hydrodynamic drive device capable of being filled and emptied of fluid comprising, rotatable pump and turbine members together cooperating to define a fluid flow path therebetween, means for filling said device with fluid, said device having a fluid discharge opening between the pump and turbine members at their outermost radial points, and means mounted on said turbine member in the path of the fluid discharged through said opening, said means comprising a ring having a plurality of blades thereon spaced circumferentially from each other, said ring being telescopically received by said turbine member and secured thereto adjacent said opening.

5. A fluid coupling capable of being filled and emptied of fluid and having rotatable pump and turbine members, a shroud element attached to each of said members and together defining a fluid flow path therebetween, means for filling said coupling with fluid, said pump and turbine shroud members at their outermost radial points defining an annular opening for the discharge of fluid from said flow path, and a plurality of blade means connected for rotation with said turbine shroud member at points closely adjacent said discharge opening directing the fluid discharge from said opening away from said opening, said blade means comprising a ring member having a plurality of blades thereon equally spaced circumferentially from each other, aligning means on said turbine member and said ring, said turbine aligning means being located adjacent said opening, said turbine member aligning means telescopically receiving said ring aligning means thereon, and means securing said ring to said turbine member.

6. A hydrodynamic drive device having a rotatable pump member and a rotatable turbine member together cooperating to define a fluid flow path therebetween, said drive device having a fluid inlet and outlet, means for supplying fluid to said inlet, and means attached to said turbine member adjacent said outlet directing fluid discharged through said outlet away from said outlet, said means comprising a ring having a plurality of perforated portions therein, said perforated portions being bent radially outwardly of said ring, said outwardly bent portions constituting blade means for directing the fluid discharged through said outlet, said turbine member telescopically receiving said ring thereon, and aligning means on said turbine member cooperating with said perforations for positioning said blade means adjacent said outlet.

References Cited in the file of this patent

UNITED STATES PATENTS

| | | |
|---|---|---|
| 2,298,105 | Canaan | Oct. 6, 1942 |
| 2,343,786 | Martin | Mar. 7, 1944 |
| 2,423,812 | Karl et al. | July 8, 1947 |
| 2,548,857 | Becker | Apr. 17, 1951 |
| 2,651,919 | Venstrom | Sept. 15, 1953 |